United States Patent [19]
Thomas et al.

[11] Patent Number: 5,154,397
[45] Date of Patent: Oct. 13, 1992

[54] PERIPHERAL KNIFE GATE SEAL

[76] Inventors: David L. Thomas, RR 1 Box 325, Aberdeen, Miss. 39730; Timothy C. Sumrall, 321 Riley, Tupelo, Miss. 38801; David L. Flippo, 511 Parkview Ave., Amory, Miss. 38821; Samuel A. Bryan, RR 2 Box 455, Hamilton, Miss. 39746

[21] Appl. No.: 703,329

[22] Filed: May 20, 1991

[51] Int. Cl.⁵ .............................. F16K 3/02
[52] U.S. Cl. ........................... 251/328; 251/170; 251/171; 251/214; 251/360; 137/375
[58] Field of Search ........... 251/326, 327, 328, 329, 251/170, 171, 193, 195, 214, 333, 334, 353, 360, 362, 365

[56] References Cited

U.S. PATENT DOCUMENTS

| | | | |
|---|---|---|---|
| 3,033,517 | 5/1962 | Rovang et al. | 251/328 |
| 4,051,863 | 10/1977 | Still | 251/328 |
| 4,206,905 | 6/1980 | Dobler | 251/328 |
| 4,377,274 | 3/1983 | Mayhew, Jr. | 251/328 |
| 4,679,770 | 7/1987 | Liberman | 251/328 |
| 4,703,915 | 11/1987 | King | 251/328 |
| 4,773,627 | 9/1988 | King et al. | 251/328 |
| 4,798,365 | 1/1989 | Mayhew | 251/328 |

*Primary Examiner*—George L. Walton
*Attorney, Agent, or Firm*—Menotti J. Lombardi

[57] ABSTRACT

A trapezoidal shaped peripheral seal is inserted in a trapezoidal cast peripheral groove in the valve body. A relief cut-out is disposed beneath the peripheral groove. The sealing function is effected by loading the peripheral seal with the gate so as to deflect the seal into the groove a relief cut out which places the seal in a shear mode.

20 Claims, 4 Drawing Sheets

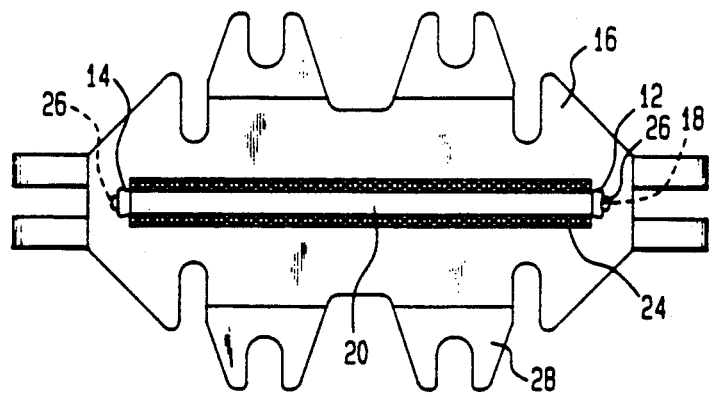
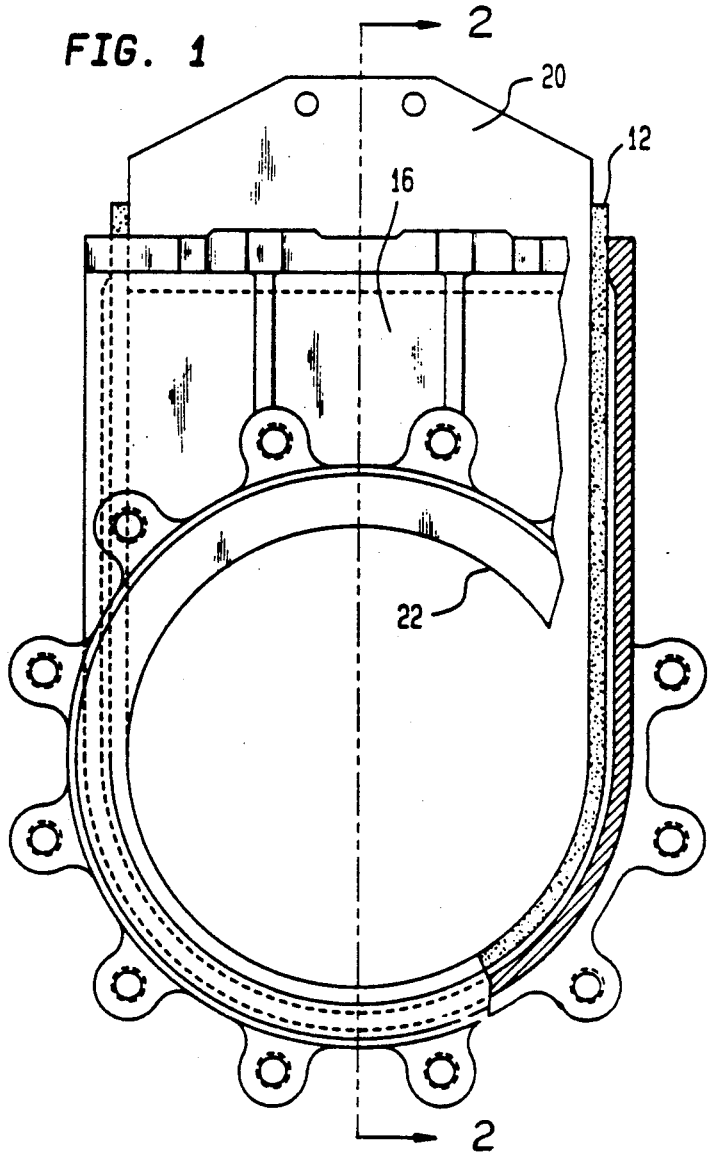
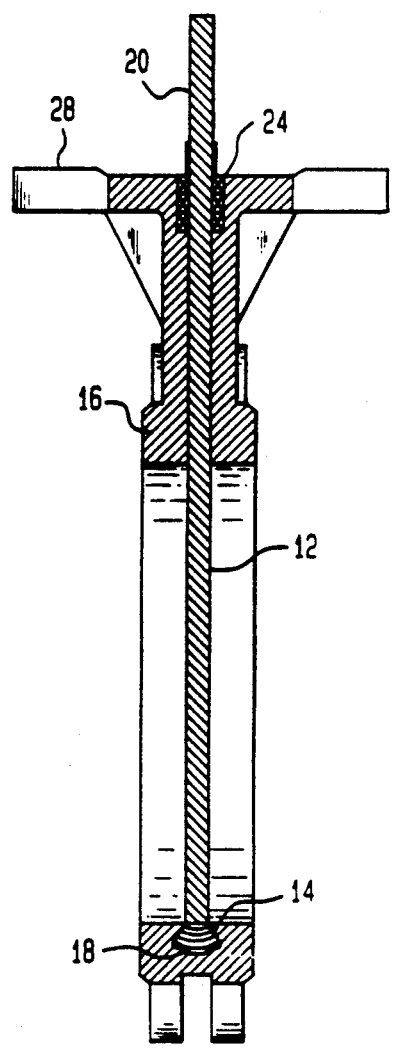

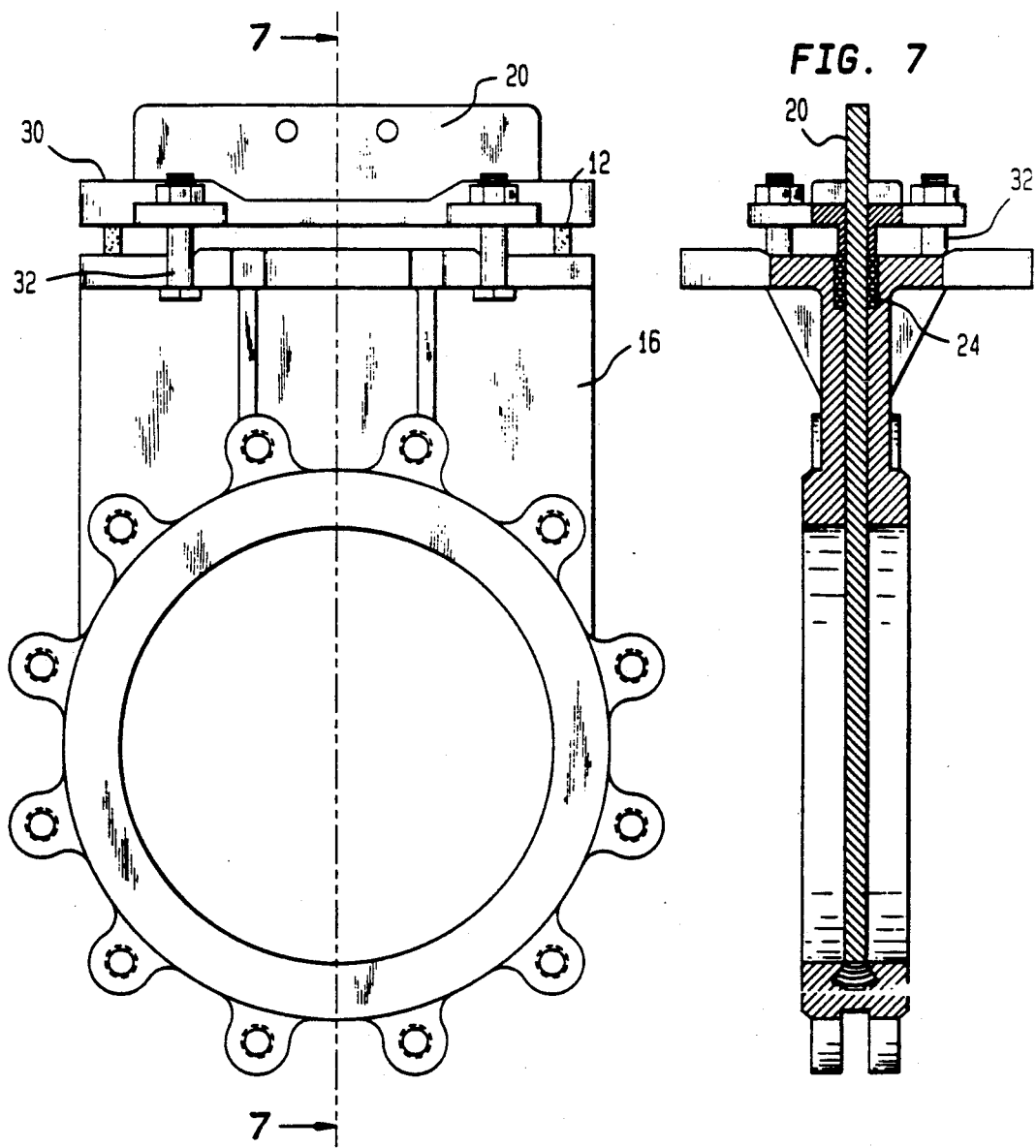

PERIPHERAL KNIFE GATE SEAL

BACKGROUND OF THE INVENTION

The invention relates to gate valves, and more particularly to knife gate valves with peripheral seals.

In prior art sealing arrangements, seals of the described type are retained in the body in a groove and use a metal reinforcing ring which is encapsulated in the seal. The seal is positioned around the edge of the gate forming a compression seal. These type of seals are retained on three sides in the body and provide bidirection shutoff. Problems with such type prior art sealing systems include the method of retaining the seal and the way a tight seal is affected. The metal reinforcement must be strong enough to retain the seal in the groove yet flexible enough to thread around the body. In some applications these seals have been sucked out of the valve. Since sealing is affected by compression of rubber between the gate edge and the body, the modulus for a compressive system limits the strain linearity to about 30%. Compression set becomes a limiting factor which causes a premature loss of sealability and leakage.

U.S. Pat. Nos. 4,679,770 (Liberman), 4,206,905 (Dobler), and 4,703,915 (King) describe U-shaped seals on the periphery of the gate, but do not describe a retention arrangement or shear loading according to the invention. U.S. Pat. No. 4,377,274 (Mayhew, Jr.) describes a knife gate valve with flat rigid frame. U.S. Pat. Nos. 2,462,493 (Hamer) and 2,851,051 (Englert et al.) show trapezoidal slots for retain seal elements; U.S. Pat. No. 2,873,943 (Williams) describes a valve with a removable seat; U.S. Pat. No. 3,353,832 (Coulson) describes a trapezoidal seal with a wire rod support; a drum seal arrangement is shown in U.S. Pat. No. 863,001; and other gate valve seal arrangements are shown in U.S. Pat. Nos. 2,893,684 (Williams et al.); 3,223,381 (Fischer, et al.); 4,522,224 (Stalder et al.); 4,623,122 (Gambetta).

Accordingly, the limitations of the prior art arrangements are overcome by the novel arrangement for retaining and loading the seal according to the invention.

SUMMARY OF THE INVENTION

An object of the invention is to provide an improved peripheral elastomer knife gate seal.

According to the broader aspects of the invention, a trapezoidal shaped elastomer seal is placed in a trapezoidal cast peripheral channel in a knife gate body, the channel having a seal relief groove to effect shear load of the seal.

BRIEF DESCRIPTION OF THE DRAWINGS

Other objects, features and advantages of the present invention will become more fully apparent from the following detailed description of the preferred embodiment, the appended claims and the accompanying drawings in which:

FIG. 1 is a frontal view of the valve with the gate in a fully closed position;

FIG. 2 is a section through the valve of FIG. 1 taken along line A—A of FIG. 1;

FIG. 3 is a top view of the valve shown in FIG. 1;

FIG. 6 is a frontal view of the valve with the packing gland bolted in place; and FIG. 7 is a section through the valve of FIG. 6 taken along line B—B of FIG. 6.

DETAILED DESCRIPTION OF THE PREFERRED EMBODIMENT

Figure 4:
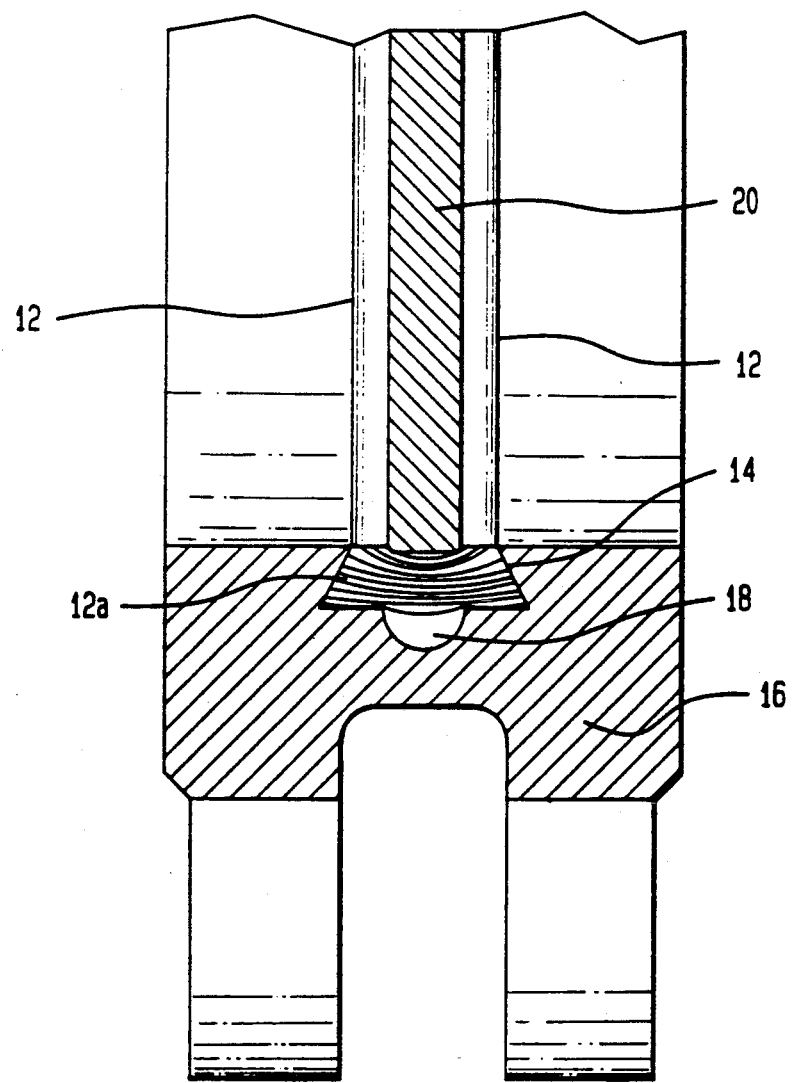
FIG. 4 is an enlarged view of the bottom portion of the valve shown in FIG. 2.
Figure 5:
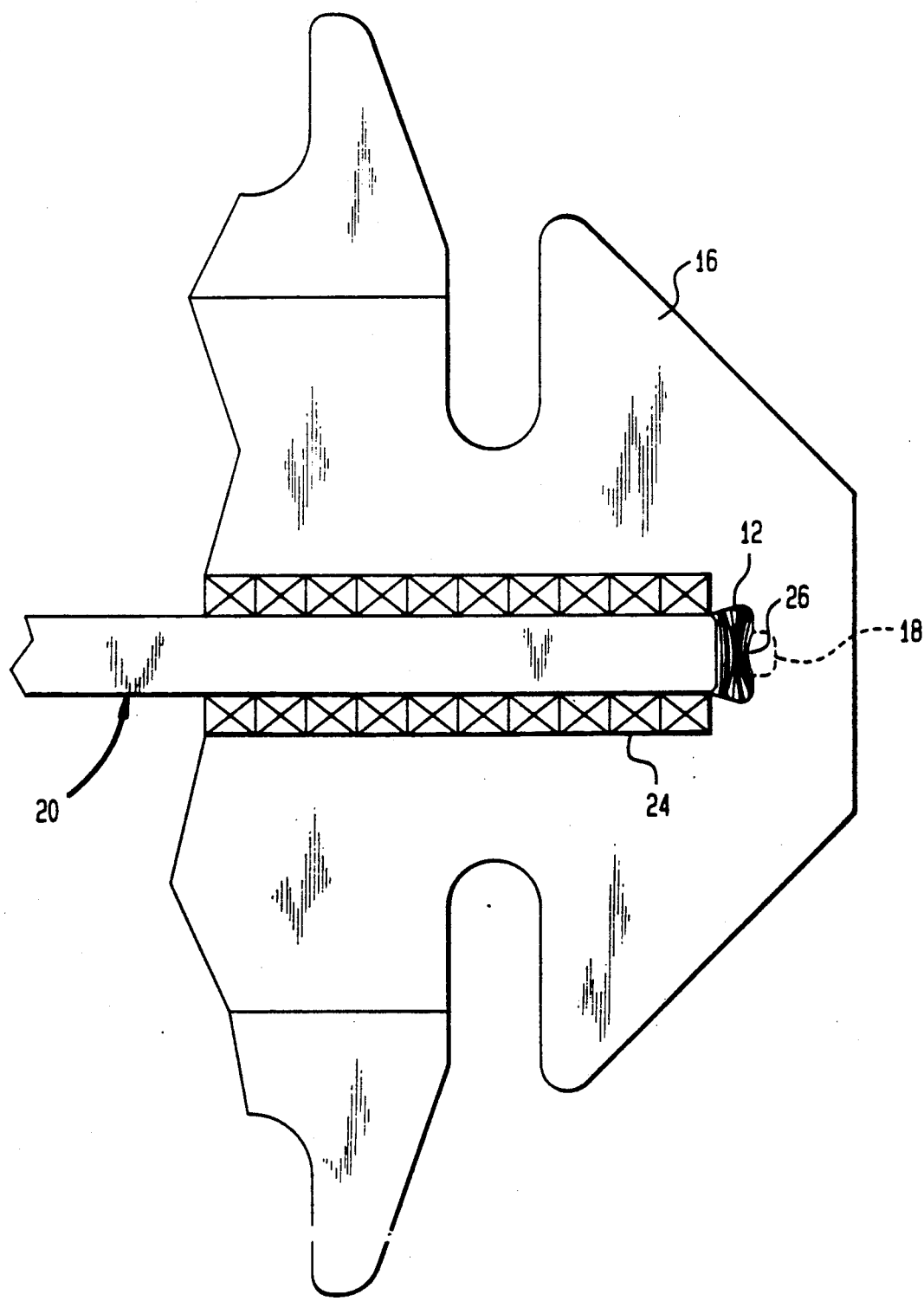
FIG. 5 is an enlarged view of a portion of the top view shown in FIG. 3.

Referring to the FIGS. 1, 2, 3, and 5, the peripheral knife gate seal according is illustrated. A trapezoidal elastomer seal 12 is threaded in a trapezoidal shaped groove 14 cast into a unitary formed body 16 so as to form a U-shaped seal. The groove 14 has a peripheral seal relief cut-out 18. The valve gate 20 is positioned to close port opening 22. Seal packing 24 is retained on both sides of gate in the upper portion of the body 16 by means of packing gland (FIGS. 6 and 7), and a boss 26 loads the seal 12 against the end of packing 24. The body includes actuator mounting ears 28.

Referring now to FIG. 4, the enlarged section shows the unitary cast body 16 with a trapezoidal groove 14 formed with a seal relief cut-out 18 on the long leg of the trapezoidal groove 14. The seal 12 is threaded in groove 14 and forced by gate 20 into a shear mode as shown by lines 12a.

The trapezoidal seal is retained in the trapezoidal groove and is placed with the small leg thereof toward the opening. This prevents the seal from being sucked out since the large leg would have to pass through the small opening. To minimize the compression set problem, the peripheral seal is placed in a shear mode rather than compressive. This provides a modulus that gives a linear characteristic to about 200% strain.

In operation, the trapezoidal seal 12 closely fits the trapezoidal cast peripheral groove 14 in the body 16 to form the U-shaped configuration. The seal is easily extruded in a solid elastomer cord preferably from EPDM, VITON, NEOPRENE, HYPALON or similar materials, using inexpensive dies as compared to molded parts. The valve body is a one piece cast stainless steel 300 series body, preferably of the 304, 316, or 317L type.

From an assembly standpoint, the extruded seal is threaded through the cast groove starting at the top of the body, down one side, around the bottom, and up the other side. The seal is retained on the periphery by the two edges which are formed by the cast peripheral groove. The seal is allowed to extend out the top of the valve and is loaded vertically by the packing gland. Referring also to FIGS. 6 and 7, the body 16 has mounted thereto a packing gland 30 by packing gland bolts 32. The seal 12 and the packing elements 24 are retained in place by the packing gland 30. Retention of the seal from threading out the top of the valve is from the packing gland loading and the cast boss which acts to retain the seal and loads the seal into the packing to seal off the packing chamber. The seal is also retained by the cast groove on the angular surfaces. The cast groove relief cut-out allows a controlled directional movement of the seal.

The seal function is affected by loading the peripheral seal with the gate so as to deflect the seal into the peripheral relief cut-out. This inventive arrangement puts the seal into a shear mode which allows for a 200% linear strain characteristic. The shear spring energy developed in the elastomer seal then effects a reactionary sealing force against the gate edge. This arrangement is suitable for single and bidirectional sealing and for clear liquids and slurries.

While the present invention has been disclosed in connection with a preferred embodiment thereof, it should be understood that there may be other embodiments which fall within the spirit and scope of the invention as defined by the following claims.

What is claimed is:

1. A valve comprising:
   a valve body having a passage therethrough for fluid flow;
   a gate being mounted in body for movement to open and close said passage way;
   said body having a trapezoidal groove extending along the entire length of said valve body with a relief cut-out disposed beneath said groove and about the entire length of the interior wall of said body adjacent said passage; and
   a trapezoidal elastomer seal being retained in said groove and extending beyond the top of said body and said groove, and when said gate is moved to a closed position deflects said seal into the groove relief cut-out and placing said seal in a shear mode while affecting a reactionary sealing force against said gate for maintaining said seal effectively against said gate to prevent leakage.

2. The valve of claim 1 including a packing strip located in the top portion of said body and on each side of said gate.

3. The valve of claim 1 including means mounted on the top portion of said body to vertically load said seal.

4. The valve of claim 2 including a boss on the top of said body for loading said seal against the end of said packing strip.

5. The valve of claim 2 including a packing gland mounted to said body for loading said seal and packing strip.

6. In combination:
   a cast valve body with a flow passage therethrough, said body having a U-shaped trapezoidal groove extending along the entire length of said body with a relief cut-out extending through said body and disposed beneath said groove;
   an extruded trapezoidal elastomer seal being retained in said groove and extending beyond the top of said body and said groove; and
   a knife gate being mounted in said body and movable in a direction perpendicular to said passage for opening and closing of said passage, and said gate in a closed position being in contact with said seal for sealing against said seal and placing said seal in a shear mode when said seal is deflected into said relief cut-out by movement of said gate into said closed position and affecting a reactionary sealing force against said gate for maintaining an effective seal against said gate to prevent leakage.

7. The combination of claim 6 including a pair of packing elements located in the top portion of said body with one element positioned on each side of said gate.

8. The combination of claim 7 including a boss located on the top portion of said body adjacent said groove for loading said seal against the end of said elements.

9. The combination of claim 8 including packing gland means on the top portion of said body for vertically loading said seal and said packing elements.

10. The combination of claim 9 wherein the short leg of said trapezoidal groove and seal is adjacent said passage.

11. A valve comprising:
    a cast valve body having a passage therethrough for fluid flow;
    a knife gate being mounted in body for movement to open and close said passage way;
    said body having cast therein a U-shaped trapezoidal groove with a relief cut-out disposed beneath said groove, said groove extending from the top of said body and about the entire length of the interior wall of said body adjacent said passage; and
    an extruded trapezoidal elastomer seal being positioned and retained in said groove and extending beyond the top of said body and said groove, and when said gate is moved to a closed position deflects said seal into the groove relief cut-out and placing said seal in a shear mode while affecting a reactionary sealing force against said gate for maintaining said seal effectively against said gate to prevent leakage.

12. The valve of claim 11 including a pair of packing strips located in the top portion of said body, one on each side of said gate.

13. The valve of claim 12 including a boss on the top of said body for loading said seal against the end of said packing strips.

14. The valve of claim 13 wherein said seal ends extend beyond the top portion of said body.

15. The valve of claim 14 including means mounted on the top portion of said body for vertically loading said seal and said packing strips.

16. In combination:
    a stainless steel cast valve body with a flow passage therethrough, said body having a U-shaped trapezoidal groove extending along the entire length of said body with a relief cut-out extending through said body and disposed beneath said groove;
    an extruded trapezoidal elastomer seal being positioned and retained in said groove and extending beyond the top of said body and said groove; and
    a stainless steel knife gate being mounted in said body movable in a direction perpendicular to said passage for opening and closing of said passage, and said gate in a closed position being in contact with said seal for sealing against said seal and placing said seal in a shear mode which provides a 200 percent linear strain characteristic, when said seal is deflected into said relief cut-out by movement of said gate into said closed position and affecting a reactionary sealing force against said gate for maintaining an effective seal against said gate to prevent leakage.

17. The combination of claim 16 including a pair of packing elements located in the top portion of said body with one element positioned on each side of said gate.

18. The combination of claim 17 including a boss located on the top part of said body adjacent said groove for loading said seal against the ends of said packing elements.

19. The combination of claim 18 wherein the short leg of said trapezoidal groove and seal is adjacent said passage.

20. The combination of claim 19 including gland means mounted on the top portion of said body for vertically loading said seal and said packing elements.

* * * * *